United States Patent [19]

Cuilleron

[11] Patent Number: 4,861,201
[45] Date of Patent: Aug. 29, 1989

[54] QUICK CHANGE ADAPTER WITH A TORQUE LIMITER FOR A TAPPING CHUCK

[75] Inventor: Jean Cuilleron, Saint Etienne, France

[73] Assignee: Societe Francaise D'Etudes et de Realisation D'Outillage, France

[21] Appl. No.: 909,212

[22] Filed: Sep. 19, 1986

[30] Foreign Application Priority Data

Sep. 19, 1985 [FR] France .................. 85 14303

[51] Int. Cl.$^4$ ............................................. B23B 31/38
[52] U.S. Cl. ................................. 408/139; 10/135 R; 10/141 H; 192/56 R; 408/142
[58] Field of Search .............. 408/139, 141, 142; 10/135 R, 141 H; 192/56 R

[56] References Cited

U.S. PATENT DOCUMENTS

| | | | |
|---|---|---|---|
| 2,514,227 | 7/1950 | Dodge | 192/56 R |
| 3,693,381 | 9/1972 | McGee | 192/56 R |
| 4,041,729 | 8/1977 | Bilz | 192/56 R |
| 4,311,224 | 1/1982 | Kato et al. | 192/56 R |
| 4,599,019 | 7/1986 | Ueberall | 408/139 |

Primary Examiner—Steven C. Bishop
Attorney, Agent, or Firm—Eric P. Schellin

[57] ABSTRACT

The object of the invention relates to the technical branch of machine-tool accessories.

The adapter features a torque limiter comprising a driving means (2) provided with a plurality of radial openings (2d) and axial openings (2e) which communicate between themselves, designed so that each set of openings (2d-2e) houses two balls arranged side by side, of which one (5) contacts the profiled recesses (1b) of a tap holder (1) of correspondent number, and the other one (6), contacts the top element (7) of an adjustable elastic means housed between the tap holder and a casing (3), so as to separate the driving means from the tap holder when the determined torque has been reached.

The invention is applicable to all tapping chucks or various machine-tools.

2 Claims, 2 Drawing Sheets

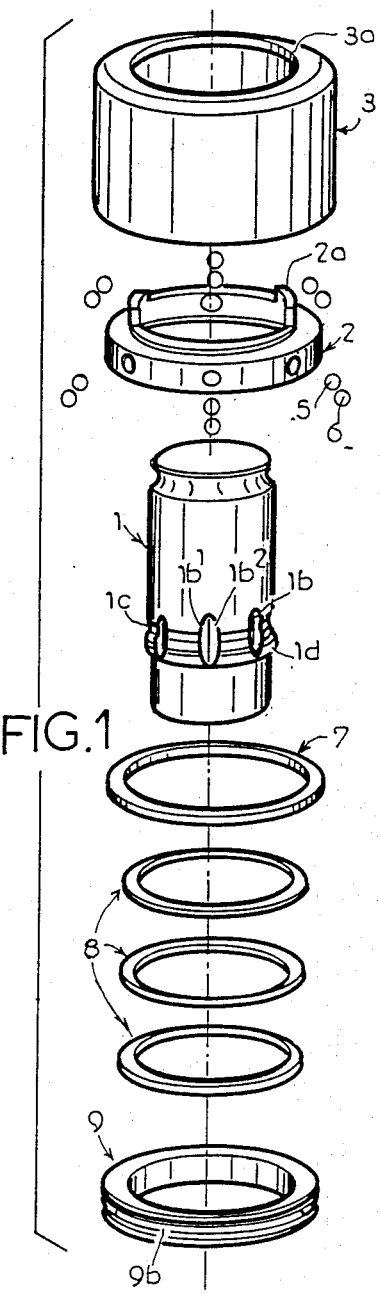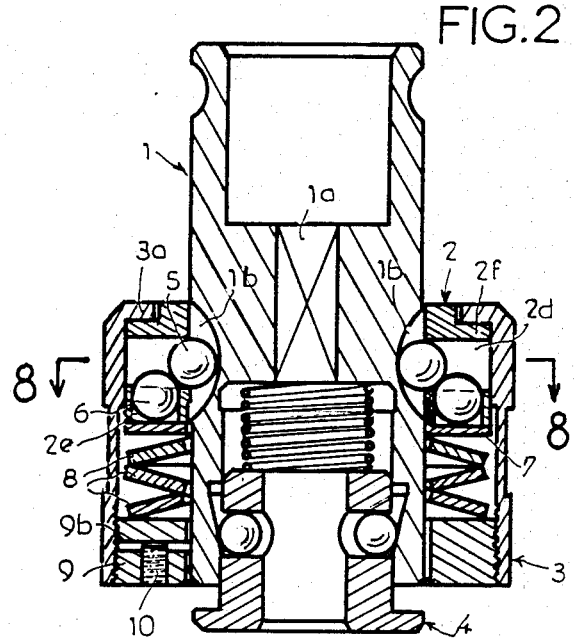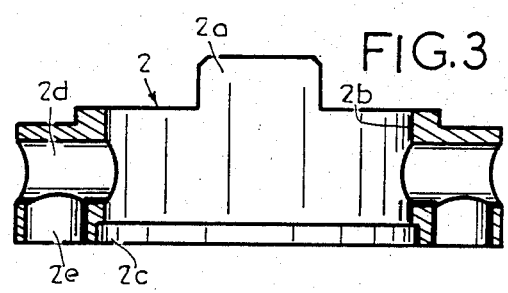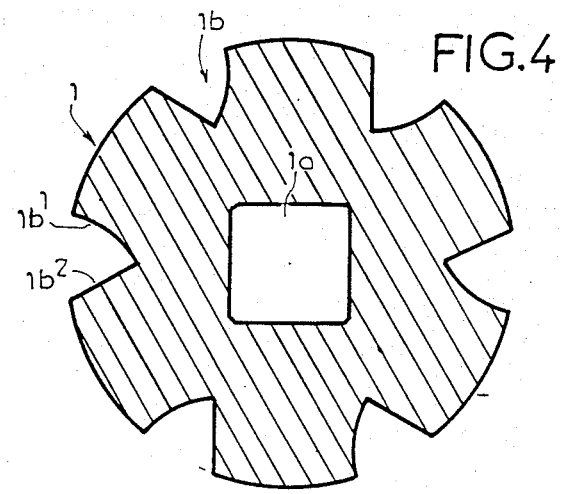

QUICK CHANGE ADAPTER WITH A TORQUE LIMITER FOR A TAPPING CHUCK

This machine relates to a quick change adapter provided with a torque limiter, for a tapping chuck.

This invention relates to the technical sector of machine tool accessories.

Apparatus of this type are used, in connection with a ball type torque limiter for example, fitted with balls housed in grooves or recesses in the driving element, and co-operating with recesses in the tap holder and with the ramps machined on a ring elastically mounted between the tap holder and a casing. When the desired torque is reached, the balls move away in a radial direction and push downwards the ring to secure the release of the tap holder in relation to the driving element.

These types of apparatus are relatively expensive due to the complexity of the shape of their elements, difficult to manufacture, the precision necessary for certain elements, which increases the machining costs, and the long and tedious assembly of various elements.

According to the invention, we wanted to create a torque limiter of economical manufacture thanks to its simple shaped components, with the limitation of precision machining, the reduction in the number of parts, and the simplification of assembly.

On the other hand, we looked to obtain an ultimate reliability with all the tapped materials, even those having a very low modulus of elasticity.

For this, the adapter according to the invention is fitted with a torque limiter including a driving element connected to the spindle of the machine and having a plurality of radial and axial openings that communicates between themselves, which are each designed to house two balls arranged side by side, one of which contacts the profiled recesses of a tap holder, and the other in contact with the top element of an adjustable elastic device whereby, it separates the tap holder from the driver when the desired torque is reached.

These characteristics and others will appear as the specification proceeds.

In order to clarify the object of the invention, however without limiting it, the invention is illustrated by the accompanying drawings, in which:

FIG. 1 is a perspective view separately illustrating the elements of the adapter according to the invention.

FIG. 2 is a cross section of the adapter shown in tapping or untapping position.

FIG. 3 is a large scale sectional view of the driving element according to the invention.

FIG. 4 is a large scale sectional view of the tap holder according to the invention.

Figure 5:
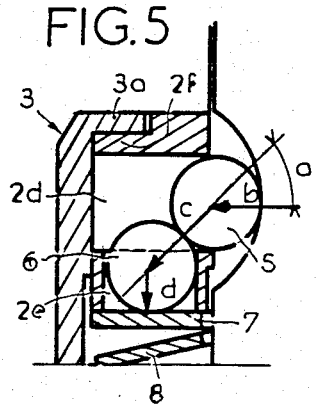
FIG. 5 is a large scale partial sectional view showing the action of the balls of the limiter.
Figure 6:
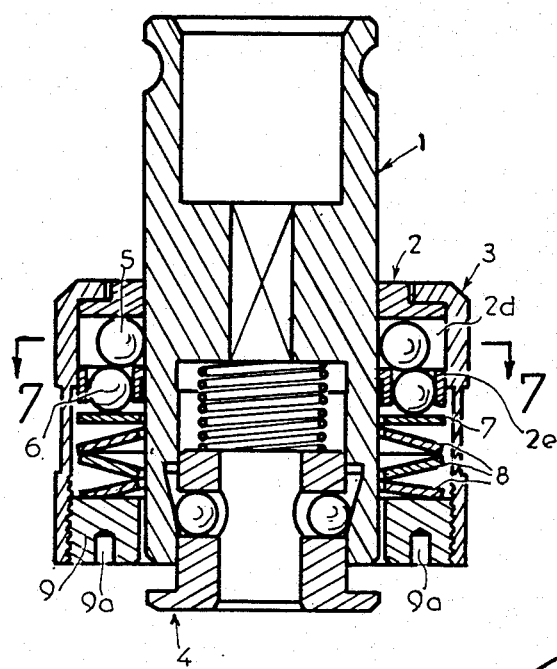
FIG. 6 is a sectional view similar to that of FIG. 2, illustrating the adapter in the released position.

The adapter according to the invention comprises, essentially of a tap holder (1), a driving element (2), and a casing (3).

The tap holder is a standard quick change, using ball bushing and spring (4), as illustrated in FIG. 2, to insure the hold of the tap which is engaged in the square bore (1a), as long as the tap holder itself is mounted on to the tapping chuck quick changer.

The rotation of the adapter is operated by the well known method of tenons (2a) of the driving element (2) co-operating with the slots of the chuck.

The connection between the tap holder and the driving element, with a view to the tapping, is obtained by a device comprising of the recesses in the tap holder (1b) machined at regular intervals at the same level of a peripheral groove (1c) situated above shoulder (1d) for the stopping of the tap holder in the driving element which is provided with a bore (2b) with counterbore for the tap holder to pass through (2c).

The driving element (2) is provided with through and axial openings (2e) opening on to the lower face and communicating with the openings (2d); the said openings (2d-2e) being in number corresponding to the number of the recesses (1b) and the dimensions calculated for the free passage of balls (5-6).

In each opening (2d-2e) there are two balls lodged (5-6) of diameter determined so that when the balls (5) are applied in the recesses (1b), the balls are engaged at least partially in the axial openings (2e) and pushing on a plain washer (7) concentric with the tap holder and seated under the driving element by elastic means of the Belleville spring type (8) or similar, prestressed by a nut (9) into the casing (3) placed over Belleville springs, in which the driving element is inserted with an interference fit and abuts against shoulders (3a-2f).

The nut (9) is of a type comprising of diametrically opposed openings (9a) for its operation, and a radial slot (9b) for locking it in position, after adjustment by a screw (10).

As illustrated in more detail in FIG. 5, the balls (5) and the balls (6) are arranged in such a way that their common centre line or line of action, forms an angle (a) of about 45° with respect to the pushing force (b) developed when the selected torque has been reached.

In this way, when the tap is stopped by an obstacle (bottom of the blind hole to be tapped, chips, defects in material . . . ), the tap holder being stopped, whereas the driving element (2) and the casing (3) continue being driven by the machine, the balls (5-6) must carry out the separation of these elements. For this purpose, the balls (5) escape from the recesses (1b) thereby pushing along the inclined line of action (c) the balls (6), which in their turn, push downwards (force d) the plain washer (7) against the Belleville springs (8).

Figure 7:
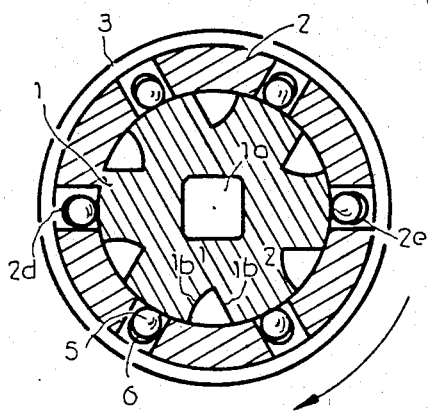
FIG. 7 is a sectional view taken along the lines 7—7, of FIG. 6, illustrating the release position.
Figure 8:
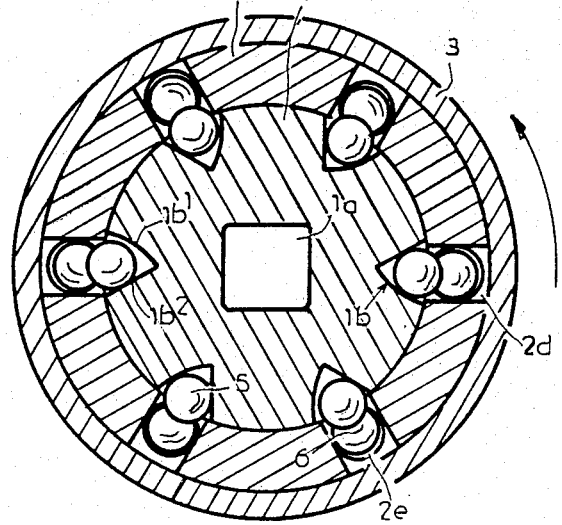
FIG. 8 is a sectional view taken along the lines of 8—8 of FIG. 2, illustrating the position of tapping or release.

As viewed in FIGS. 4, 7 and 8, the recesses (1b) are dissymetrical with a different half-moon shaped profile, i.e. in the tapping direction, the balls (5) are seated on a concave face (1b1) which is more open than the opposite face (1b2) which is flat in order to have a higher driving effect in the untapping direction in case of the material being jammed (FIG. 8), whereas the concave face facilitates the escape of the balls.

When the rotation direction is reversed (untapping) the balls assume naturally their place into the recesses through the elastic return, even when the modulus of elasticity of the material is low.

The advantages will become more apparent from the description, but the following features are more particularly underlined: the simplification of the adapter compared with the equipments known, thanks to the reduction of the number of component parts, of their simple shapes which allows an easy manufacture of the same, and to the facility of assembly of the component parts.

I claim:

1. Quick change adapter provided with a torque limiter for a tapping chuck, comprising a cylindrical tap holder having a plurality of dissymetrical recesses on its surfaces consisting of two vertically disposed walls that intersect, an annular driving element mounted concentrically with respect to the tap holder and adapter and constructed to be driven, an outer cylindrical casing mounted concentrically with respect to said driving element, said driving element having a plurality of radially extending bores in communication with said tap holder, said driving element having a plurality of axially extending bores through the bottom thereof an in communication with the radially extending bores, each of said radially extending bores and said axially extending bores together in said driving element being supplied with two balls, the bottom of the driving element having spring loaded means adapted and constructed to impinge on one of said two balls in said bores whereby to drive said so impinged balls upwardly against the said second of said balls whereby to thrust said second of said balls against the said cylindrical wall of said tap holder when said second of said balls is in one disengaged position and into one of said recesses when said second of said balls is in another position whereby said tap holder and said driving element are in operative rotational engagement.

2. The quick change adapter of claim 1 wherein one wall of the recess describes a concave face onto which a ball seats when the tap holder is rotated in a tapping direction below a preselected torque and the other wall describes a flat face onto which a ball seats when the tap holder is rotated in the opposite direction.

* * * * *